2,792,435

PREPARATION OF METHYL CHLORIDE AND METHYLENE CHLORIDE

James J. Lukes, Euclid, and William J. Lightfoot, Cleveland Heights, Ohio, and Robert N. Montgomery, Baytown, Tex., assignors to Diamond Alkali Company, Cleveland, Ohio, a corporation of Delaware No Drawing. Application April 30, 1954,
Serial No. 426,898

10 Claims. (Cl. 260—662)

This invention relates to the gas phase chlorination of methane. More particularly, the invention is concerned with a method by which methylene chloride may be produced in large quantity and in instances as the dominant product among those usually produced in the general reaction. As is well-known, the direct chlorination of methane leads to the production of methyl chloride, methylene chloride, chloroform, carbon tetrachloride and other heavier materials such as hexachloroethane.

Methylene chloride is a solvent primarily, and in such capacity it is used in innumerable situations. It is also used as a reagent in the preparation of many chemical substances and as a preservative in biological and pharmaceutical preparations. In the recent past, its use has grown quite noticeably.

Heretofore, the quantity of material needed to supply these various needs has, in the main, been obtained from processes which are primarily directed to the production of carbon tetrachloride, chloroform and other similar chlorohydrocarbons. In other words, it has been a very valuable by-product of several other major processes. The supply of the material which has thus been made available seems to have been adequate to satisfy the needs of industry. However, it now appears that the usefulness for methylene chloride has increased to a point such that the operation of a process directed specifically to its production is warranted.

In investigating the art relating to methylene chloride, it is found that almost nothing has been reported concerning its manufacture. In fact, processes involving direct chlorination of methane have been centered upon reducing the production of lower chlorinated products and increasing the production of materials such as carbon tetrachloride and chloroform. The production of methylene chloride as the predominant component in a process involving direct chlorination of methane is extremely difficult. The problems that are encountered in its production are most discouraging.

It is found that the reaction to form methylene chloride is beset with the general well-known difficulties of other chlorination reactions in addition to problems that are peculiar to it as a particular process. Thus, the problem of carbonization and the formation of heavy ends such as hexachloroethane and hexachlorobenzene are present and must be met. In order to do this, it is necessary to introduce diluents which reduce the reactor capacity accordingly. It is also necessary, as is indicated in the prior art, to maintain a very high ratio of methane to chlorine and this reduces the capacity of the reactor still further.

According to previous disclosures, it is necessary to maintain a ratio of methane to chlorine of between about 3 and 20 to 1. This is said to be necessary in the first place because at ratios of less than one and one-half volumes of methane to one of chlorine, the reaction becomes explosive. Secondly, according to the prior art, it is thought at least three volumes of methane must be employed in order to decrease excessive quantities of chloroform and carbon tetrachloride.

In connection with other reactions leading to the formation of carbon tetrachloride, chloroform, perchloroethylene and the like, it has been found that quite significant improvements in the overall reaction are accomplished by carrying it out in a bed of finely divided solids maintained in fluidized state usually by passage of the reactants therethrough. The present invention makes use of this phenomenon in the production of methylene chloride. However, as will be noted from the description of the invention hereinafter presented, this aspect of the process of the invention is merely a step in the proper direction; it has not been found possible to obtain methylene chloride in the quantity that is desired, and in the relative proportion of the products of the reaction that makes the process feasible, by simply introducing chlorine and methane, in the quantities which might normally be expected to react to produce methylene chloride, into a bed of fluidizable solid material.

The process of this invention seeks to provide methylene chloride in the products resulting from the direct chlorination of methane, at least in equal volume to chloroform which is formed concurrently therewith, and preferably, much higher than equal parts, specifically, up to about two parts methylene chloride to one part of chloroform. The present invention seeks also to achieve a high degree of utilization of the quantity of methane employed in the reaction.

When one considers the factors that are involved in the reaction, it will become apparent that little difficulty should be encountered in effecting substantially complete reaction of all of the chlorine which is introduced into the system. This is because of the large excess of methane that normally is present. Also, it can be seen, if the quantity of methane is held constant, and the quantity of chlorine that is introduced is progressively increased, the quantity of methane reacted then should be directly related to the quantity of chlorine fed in and the reacted quantity should increase as the chlorine increases. This is to a certain extent true but one is never able to utilize all of the methane present without having an excess of chlorine. As chlorine increases in the reaction, chloroform and carbon tetrachloride appear in the products in ever increasing quantities. It can be seen that such a situation cannot be tolerated in the production of methylene chloride and that a way must be found to increase the quantity of chlorine which is introduced if the efficiency of the reaction is to be increased and, at the same time, control the formation of chloroform and carbon tetrachloride. This is exactly what the present invention accomplishes.

According to this invention, it has been found possible to greatly increase the quantity of chlorine in relation to the quantity of methane in a reaction involving the direct chlorination of methane, in such a manner as to obtain quantities of methylene chloride in ratios up to about 2 to 1 of chloroform. This is accomplished without the formation of substantial quantities of carbon tetrachloride, heavy end material, such as hexachloroethane and hexachlorobenzene, and also without carbonization in the reaction zone.

Whereas, in the past as noted above, in following the teachings of the prior art, it has been possible to tolerate as a maximum a chlorine to methane ratio of 1:3 in methylene chloride production, according to the present invention, it has been discovered that chlorine and methane can be reacted in high ratio, for example, 0.75:1 and higher, to produce predominantly methylene chloride in excellent quantity relative to chloroform production and with the formation of only negligible quantities of carbon tetrachloride and heavy ends.

Generally stated, the process of this invention involves bringing together chlorine and methane in the gas phase within a reaction chamber containing a quantity of subdivided solid material, functioning as a heat transfer material, in a manner such that the solid material is maintained in a state of continuous ebullient motion as the gases pass through it toward the outlet of the reaction chamber. As an aid, additional to the heat transfer material, for controlling the severity of the reaction so that it does not reach explosive proportions, and as an aid in controlling the product distribution advantageously to the formation of methylene chloride, carbon tetrachloride is introduced to the reaction zone concurrently with the introduction of chlorine and methane. During the reaction, and from its outset, the relative quantities of the three initial constituents are specifically correlated and their total feed quantity is related to the reactor in terms of space velocity to the end that the reacting constituents shall react as completely as possible and at the fastest rate, with the greatest possible quantity of product resulting as methylene chloride.

In the preferred form of the invention, carbon tetrachloride is introduced into the reaction zone in the liquid phase. The preference for liquid carbon tetrachloride is indicated because it appears that the severity of the reaction is thereby more readily controlled, to the end that a minimum of carbonization takes place and the overall yield of chlorinated products is improved. It is to be noted also that the capacity of the reactor is increased somewhat due to the fact that a lesser quantity of liquid carbon tetrachloride is ordinarily required than of carbon tetrachloride vapors in order to accomplish the intended purpose. However, the invention contemplates that carbon tetrachloride vapor may be employed since its use is not found to disturb the distribution ratio of the chlorinated products to a substantial extent.

Carbon tetrachloride may be supplied from storage or it may be obtained as a recycle material if sufficient quantity is produced in the reaction to supply the need. Of course, such carbon tetrachloride as is produced in the reaction may be recycled to the process and if additional carbon tetrachloride is needed, such may be supplied from storage.

While it is not essential to the broadest concept of the invention, the invention also contemplates that methyl chloride may be introduced into the reaction zone along with the other feed materials. Methyl chloride may be fed to the reaction zone from storage but, preferably, it is obtained as a recycle product. It is also not essential to the broader concept of the invention that chlorine be introduced at a multiplicity of points in the reaction zone. However, the invention, in its preferred embodiment, contemplates the introduction of chlorine at a plurality of points, preferably, at least three points, and more if desired and found feasible in a particular instance.

It might be said in regard to the introduction of methyl chloride and the introduction of chlorine at a plurality of points in the reaction zone that the introduction of methyl chloride appears to influence the reaction very favorably to the end that greater quantities of methylene chloride are produced, and that as a result of introducing chlorine at more than one inlet, the ratio of chlorine to methane may be increased still further with general improvement in the process in other respects.

While very small quantities of chlorine in relation to methane may be employed in the process of the invention, generally, it is preferable to supply chlorine at least in the molar ratio of about 0.10–1.0 chlorine:1 methane, preferably chlorine is supplied at the rate of about 0.30–1.0 mols chlorine:1 methane. More suitably, where apparatus is employed providing for the introduction of chlorine at only one point, the chlorine is introduced at the rate of about 0.30–0.60 mol of chlorine for each mol of methane. Where a plurality of inlets are provided for the introduction of chlorine, it is preferable that higher feed rates of chlorine be employed, namely, up to about 1 mol of chlorine for each mol of methane. However, it will be understood that lesser quantities of chlorine may be employed in the plural type inlet reactor with satisfactory results.

The quantity of carbon tetrachloride employed in the reaction is determined in relation to the quantity of chlorine which is fed to the reaction zone. Generally, chlorine and carbon tetrachloride may suitably be present in the ratio of from about 1–10 mols of chlorine:1 mol of carbon tetrachloride. Again, reason is found for varying the quantity of carbon tetrachloride relative to the number of feed inlets that are employed for the introduction of chlorine. Where a single chlorine inlet is provided, carbon tetrachloride may suitably be present in the ratio of about 1.0–3.0 mols of chlorine for each mol of carbon tetrachloride. However, where several inlets are provided for chlorine, it is possible to reduce the amount of carbon tetrachloride quite markedly. Thus, carbon tetrachloride may be introduced at a ratio as low as 1 mol to 10 of chlorine. For example, where three inlets are employed for chlorine introduction, it is found that chlorine in the ratio of about 7 mols to 1 of carbon tetrachloride is quite suitable and that no undue difficulties are encountered in the reaction.

Generally, the invention contemplates that methyl chloride may be omitted from the reaction entirely or employed in quantities up to about 20 mol percent of the feed gases. The term "feed gases" herein denotes methane alone where methyl chloride is omitted from the reaction; in cases where methyl chloride is employed, the term denotes the combined quantities of methane and methyl chloride. Amounts of methyl chloride above about 20 mol percent of the feed gases appears to lead to the formation of disproportionate quantities of chloroform, especially where the higher chlorine-methane ratios are employed.

Ordinarily, the temperature in the reaction zone is maintained rather constant and is selected within the range of about 650° to about 750° F., preferably about 675° to 725° F. More specifically, a temperature of about 700° F. appears to be quite satisfactory for the process regardless of other conditions that are employed within the limits herein described. It might be said, however, that higher temperatures may be employed if the production of carbon and heavy ends is carefully observed. In the event that these undesirables appear in the product, it will be possible to offset their formation by an increase in space velocity. However, as would be expected, there is a limit upon the amount of correction that alteration of space velocity can effect and the limit will have to be established for the individual cases as need arises.

Generally, it is contemplated that gas velocities in the reaction zone may range from about 0.20 foot per second to about 1.0 foot per second. More suitable, however, are found to be gas velocities within the range of about 0.40–0.60 foot per second.

The solid material which is employed in the reaction zone is primarily for the purpose of effecting rapid dissipation of heat that is produced as the reaction proceeds. Suitably, the solid material may be any one or mixture of many well-known materials. Thus, the solids may be pumice, kieselguhr, fuller's earth, Attapulgus clay, crushed firebrick, sand, calcined shales and the like. Finely divided metals, such as nickel shot, may be employed. Of this group of materials, Attapulgus clay has been found especially suitable in the sense that it does not appear to exert any undesirable directing influence in the reaction and in the further sense that its heat transfer properties are in no way impaired regardless of the length of time that it is used in carrying out the reaction. The form of the solid material is not especially critical and it may be in the form of lumps, balls, pellets and the like of varying size. However, because of the improved heat transfer properties of finely divided material, it is preferred to employ it in rather finely divided form, for example, from about 100 to 300 mesh.

Generally, it is contemplated that the solid material, where employed in the elongated type reaction zone, will occupy the reaction space to the extent of about one-third of its volume. Many types and forms of reactors may be employed, but it is preferred that the solid material does not occupy the entire internal space of the reactor for the reason that the ebullient motion of the mass is in such case quite easily maintained, and difficulties due to particle entrainment is minimized. The solid material which is employed may be catalytic if desired; in fact, it may be that Attapulgus clay which is suggested herein for use, has a small catalytic effect. However, it is not thought that a catalyst is necessary and if one is employed, care should be exercised in its selection so that the reaction is not overly accelerated.

The foregoing paragraphs have been devoted to describing the general conditions under which the reaction takes place. It is now desired to describe the process in relation to a suitable apparatus and to point out certain techniques that have been found advantageous in accomplishing the preferred results of the invention.

Suitable equipment for use in carrying out the invention may comprise an elongated tubular reactor provided with one or more inlets for reactants along its length, preferably in the lower half of the reactor and extending into about the center thereof, and one or more outlets for products near its top. Such a reactor may be of, for example, nickel or nickel-lined steel, and for example, in internal dimensions, may measure 10 feet in length and about 2.75 inches in diameter. Means for heating the reactor is provided which may comprise a pair of resistance coils mounted on the exterior of the reactor adjacent its upper and lower sections. Suitably, these coils may be independently controlled so as to provide for and correct temperature fluctuations within the reaction zone. Suitable insulation may encase the reactor and surrounding coils. Storage and feed means are provided for supplying the several reactants to the point or points of inlet to the reactor and the inlet means are provided with calibrated rotameters for controlling the quantity of flow. Temperature and pressure indicators and recorders are associated with the reactor in order that the temperature and pressure therein may be observed as the reaction proceeds, and, if necessary, controlled so as to keep the reaction within the preferred limits. The equipment includes also suitable product recovery apparatus such as a cyclone separator for fines removal, condensers, refrigerating means and the like.

Prior to putting the process on full stream, the reactor is brought up to about the preferred reaction temperature by means of the resistance heater and just prior to introducing the reactants, the reaction zone is purged of extraneous gases by feeding in a quantity of methane for a short period, for example, about 5 minutes. Once the temperature of the reactor is up and the reactor has been cleared of extraneous gases, carbon tetrachloride may be introduced followed by chlorine. Preferably, as those skilled in the art will appreciate, the process at this point should not be operated at full stream but rather, chlorine should be introduced only gradually at first with careful observation of the pressure and gas flow conditions so as to make certain that excessive gas velocities are not built up such as would entrain the catalyst and cause the outlet lines to plug. Accordingly, as much as two hours may be required to put the system in perfect balance so that a minimum of adjustment of the quantities of incoming materials will be necessary and so that a proper balance between the heat supplied externally, the heat lost throughout the system, and the heat supplied by the reaction is maintained. Once the proper balance has been attained, thereafter only minor adjustments are necessary to keep the system functioning quite properly.

There follows immediately hereafter a tabulation of examples of the process of the present invention:

| Example Number | Bed Temp., °F. | Space Velocity, Ft./Sec. | $Cl_2$: $CH_4+CH_3Cl$ Molar Ratio | $Cl_2$: $CCl_4$ Molar Ratio | Mol Percent $CH_3Cl$ in Feed Gas | G. Mol Per Hr. $Cl_2$ Feed | G. Mol Per Hr. $CH_4+CH_3Cl$ Feed |
|---|---|---|---|---|---|---|---|
| 1 | 700 | 0.52 | 0.55:1 | 1.13:1 | None | 11.9 | 21.5 |
| 2 | 735 | 0.51 | 0.55:1 | 2.2:1 | 8.0 | 13.1 | 23.6 |
| 3 | 700 | 0.53 | 0.31:1 | 1.7:1 | 11.3 | 9.5 | 30.2 |
| 4 | 685 | 0.50 | 0.61:1 | 5.6:1 | 12.3 | 15.1 | 24.7 |

| Example Number | Percent $CH_4$ Reacted | Percent $Cl_2$ Reacted | G. Mol Per Hr. $CH_2Cl_2$ | G. Mol Per Hr. Free Carbon | Products Weight Percent (HCl-Free) | | | | |
|---|---|---|---|---|---|---|---|---|---|
| | | | | | $CH_3Cl$ | $CH_2Cl_2$ | $CHCl_3$ | $CCl_4$ | Heavy Ends |
| 1 | 31.6 | 100.0 | 1.92 | 0.13 | 39.4 | 34.5 | 26.2 | 0.0 | 0.0 |
| 2 | 33.2 | 100.0 | 2.50 | 0.00 | 35.2 | 35.4 | 24.7 | 3.1 | 1.7 |
| 3 | 24.0 | 100.0 | 2.50 | 0.00 | 43.3 | 30.5 | 16.6 | 8.3 | 1.4 |
| 4 | 42.7 | 100.0 | 4.09 | 0.23 | 34.8 | 39.3 | 22.8 | 3.1 | 0.0 |

In the above tabulated examples, the same general procedure is followed in all instances. The examples reflect the results that are obtained after operating the process for a period of eight hours from the time that the reactor is placed on full stream. Pressure is substantially atmospheric though not necessarily. For example, pressures of 100 p. s. i. g., or more are not found to be detrimental. Methane and methyl chloride are delivered through a common feed inlet in their respective metered quantities into the center of the reactor at a point adjacent the bottom end thereof. Chlorine and liquid carbon tetrachloride are introduced into the center of the reactor in their respective metered quantities through a common inlet, or inlets in the case where more than one chlorine inlet is provided, at a level in the reactor about twelve inches above the point of introduction of methane and methyl chloride. In the case of Example 4, three inlets for chlorine and carbon tetrachloride are provided each of which inlets deliver chlorine and carbon tetrachloride to the center of the reactor at spaced points from the point of introduction of methane and methyl chloride, each inlet being about twelve inches above the other.

While in Example 4, chlorine and carbon tetrachloride are delivered to the reactor together thru three separate inlets, they may be introduced separately, i. e., there may be six inlets, three for chlorine and three for carbon tetrachloride. Also, chlorine may be fed thru several inlets while feeding carbon tetrachloride thru a single inlet in a manner suitable to disperse it properly in the reaction zone.

Preferably, where a plurality of inlets for chlorine and carbon tetrachloride are provided, the respective quantities of each are divided equally, or substantially so, between the several inlets. However, it will be appreciated that equal division is not essential in the practice of the process of the invention.

It will be noted that temperatures and gas velocities do not differ greatly for all of the several examples and it should be mentioned that the reactor in the case of each of the examples contains a body of finely divided Attapulgus clay.

The results of the invention are strikingly illustrated by these examples and particularly by Examples 3 and 4. It will be noted that in both of these cases, the methylene chloride to chloroform ratios are very similar and are quite high. In the case of Example 3, only one inlet is provided for chlorine and carbon tetrachloride whereas in Example 4, three inlets are provided, the total quantity of chlorine and carbon tetrachloride being divided equally among each of the three inlets. Insofar as excellence of distribution of the products of the process are concerned, it will be observed that the result in Example 3 is slightly superior to that in Example 4, and accordingly, the invention is susceptible of operation in accordance with the conditions of Example 3 whereby advantage can be taken of the improved distribution. Where, however, a larger overall quantity of methylene chloride is desired, production can be increased with little sacrifice in the distribution ratio without the installation of higher capacity equipment. It will be observed that in Example 4, chlorine is fed in at a much higher ratio, and carbon tetrachloride is fed in at a much lower ratio. Methane in total quantity in Example 4 is less than in Example 3, but the total quantity of methylene chloride produced is much higher than in Example 3.

Examples 1 and 2 are set forth primarily to illustrate the flexibility of the process in making full utilization of methyl chloride to improve the product distribution ratio. In many instances, it is contemplated that there will be a need for a highly efficient process which produces a predominant quantity of methylene chloride but which also produces chloroform in a worthwhile amount. It will be seen that the methylene chloride to chloroform ratio as exemplified by Example 1 is highly attractive. In many instances, however, the methylene chloride to chloroform ratios that are achieved by Examples 2, 3 and 4 are more desirable. Higher ratios are believed to be attained, at least in part, by the introduction of methyl chloride, as exemplified in Example 2, within the reactor.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the process of chlorinating methane to obtain products of lower chlorine content than carbon tetrachloride and directing the chlorination reaction so as to obtain a predominance of methyl chloride and methylene chloride, the improvement which includes simultaneously feeding chlorine, methane, and carbon tetrachloride, into a body of fluidizable solids at gas velocities between about 0.20 and 1.0 foot per second, maintaining the temperature within the reaction zone substantially within the range of 650° to 750° F., the molar ratio of said chlorine to said methane in the feed gases being substantially within the range of 0.10 to 1.0:1, and the molar ratio of said chlorine to said carbon tetrachloride being substantially within the range of 1–10:1.

2. The process of claim 1 wherein the improvement includes maintaining the temperature of the reaction zone substantially within the range of 675°–725° F., and maintaining the gas velocity in the reaction zone substantially within the range of 0.40–0.60 foot per second.

3. The process of claim 2 wherein the improvement includes a molar ratio of chlorine to methane substantially within the range of 0.30–0.60:1, and the molar ratio of chlorine to carbon tetrachloride is substantially within the range of 1–3:1.

4. The process of claim 2 wherein said chlorine is introduced into the reaction zone at a plurality of spaced points in the direction of the flow of gases within the reaction zone.

5. The process of claim 4 which includes introducing the chlorine and carbon tetrachloride simultaneously to a plurality of spaced points in the reaction zone in the direction of the flow of gases therein, and in substantially equal amounts at each of said points.

6. The process of claim 1 wherein the improvement comprises feeding methyl chloride to the reaction zone, the molar ratio of said methyl chloride to said methane being up to 1.0:4.

7. The process of claim 5 wherein the molar ratio of said chlorine to methane is substantially within the range of 0.30–0.60:1, the molar ratio of said chlorine to said carbon tetrachloride is substantially within the range of 1–3:1, and the temperature in the reaction zone is substantially within the range of 675° to 725° F.

8. In a process for chlorinating methane to produce chlorinated methane of lower chlorine content than carbon tetrachloride and directing the reaction to provide a predominance of methyl chloride and methylene chloride in the reaction product, the improvement which includes the steps of simultaneously feeding chlorine, methane, and carbon tetrachloride, into a body of fluidizable solids at a gas velocity of about 0.50 foot per second, maintaining the temperature within the reaction zone at approximately 700° F., the molar ratio of said chlorine to said methane being substantially within the range of 0.30–0.75:1, said chlorine and said carbon tetrachloride being delivered to said body at a plurality of spaced points in the direction of the flow of gases in said reaction zone and in substantially equal amounts at each of said points, and the ratio of said chlorine to said carbon tetrachloride being supplied within the range of 3–7:1.

9. The process as claimed in claim 8 wherein the improvement includes providing methyl chloride in the feed gases to the reaction zone, the molar ratio of said methyl chloride to said methane being substantially up to one mole of said methyl chloride per four moles of said methane.

10. The process of claim 9 which includes feeding carbon tetrachloride to said reaction zone at points coinciding substantially with the points of introduction of said chlorine.

References Cited in the file of this patent

UNITED STATES PATENTS

| | | |
|---|---|---|
| 1,190,659 | Lacy | July 11, 1916 |
| 1,918,624 | Wheeler et al. | July 18, 1933 |
| 2,105,733 | Hass et al. | Jan. 18, 1938 |
| 2,147,577 | Hass et al. | Feb. 14, 1939 |
| 2,406,195 | Cass | Aug. 20, 1947 |
| 2,429,963 | Reitlinger | Oct. 28, 1947 |
| 2,676,998 | Kuntz et al. | Apr. 27, 1954 |